United States Patent
Dowdall et al.

(10) Patent No.: US 9,080,866 B1
(45) Date of Patent: Jul. 14, 2015

(54) METHODS AND SYSTEMS FOR DETECTION OF REFLECTIVE MARKERS AT LONG RANGE

(71) Applicant: Google Inc., Mountain View, CA (US)

(72) Inventors: Jonathan Baldwin Dowdall, Mountain View, CA (US); Jiajun Zhu, Mountain View, CA (US); Pierre-yves Droz, Mountain View, CA (US); Luke Wachter, Mountain View, CA (US); Dorel Ionut Iordache, Mountain View, CA (US)

(73) Assignee: Google Inc., Mountain View, CA (US)

( * ) Notice: Subject to any disclaimer, the term of this patent is extended or adjusted under 35 U.S.C. 154(b) by 100 days.

(21) Appl. No.: 13/927,518

(22) Filed: Jun. 26, 2013

(51) Int. Cl.
| | |
|---|---|
| *G01B 11/00* | (2006.01) |
| *G01S 17/10* | (2006.01) |
| *G01B 11/28* | (2006.01) |
| *G01S 17/02* | (2006.01) |

(52) U.S. Cl.
CPC .............. *G01B 11/285* (2013.01); *G01S 17/023* (2013.01); *G01S 17/026* (2013.01)

(58) Field of Classification Search
USPC ............. 356/600–625, 4.01; 701/70, 34, 446, 701/301, 23, 26; 702/3, 94, 95, 97, 134, 702/155, 158
See application file for complete search history.

(56) References Cited

U.S. PATENT DOCUMENTS

| | | | |
|---|---|---|---|
| 6,859,705 B2* | 2/2005 | Rao et al. ......................... | 701/45 |
| 6,972,710 B2* | 12/2005 | Matsubara et al. ............. | 342/70 |
| 7,979,173 B2 | 7/2011 | Breed | |
| 8,194,927 B2 | 6/2012 | Zhang | |
| 8,428,305 B2* | 4/2013 | Zhang et al. .................. | 382/103 |
| 8,452,569 B2* | 5/2013 | Brown .......................... | 702/181 |
| 8,755,983 B2* | 6/2014 | Ota et al. ......................... | 701/70 |
| 8,825,260 B1* | 9/2014 | Silver et al. .................... | 701/23 |
| 8,874,267 B1* | 10/2014 | Dolgov et al. ................ | 700/255 |
| 2004/0128102 A1* | 7/2004 | Petty et al. ..................... | 702/150 |
| 2011/0040482 A1 | 2/2011 | Brimble | |
| 2012/0083982 A1* | 4/2012 | Bonefas et al. ................. | 701/70 |
| 2014/0307247 A1* | 10/2014 | Zhu et al. ..................... | 356/4.01 |

* cited by examiner

*Primary Examiner* — Sang Nguyen
(74) *Attorney, Agent, or Firm* — McDonnell Boehnen Hulbert & Berghoff LLP

(57) ABSTRACT

Example methods and systems for detecting reflective markers at long range are provided. An example method includes receiving laser data collected from successive scans of an environment of a vehicle. The method also includes determining a respective size of the one or more objects based on the laser data collected from respective successive scans. The method may further include determining, by a computing device and based at least in part on the respective size of the one or more objects for the respective successive scans, an object that exhibits a change in size as a function of distance from the vehicle. The method may also include determining that the object is representative of a reflective marker. In one example, a computing device may use the detection of one reflective marker to help detect subsequent reflective markers that may be in a similar position.

17 Claims, 6 Drawing Sheets

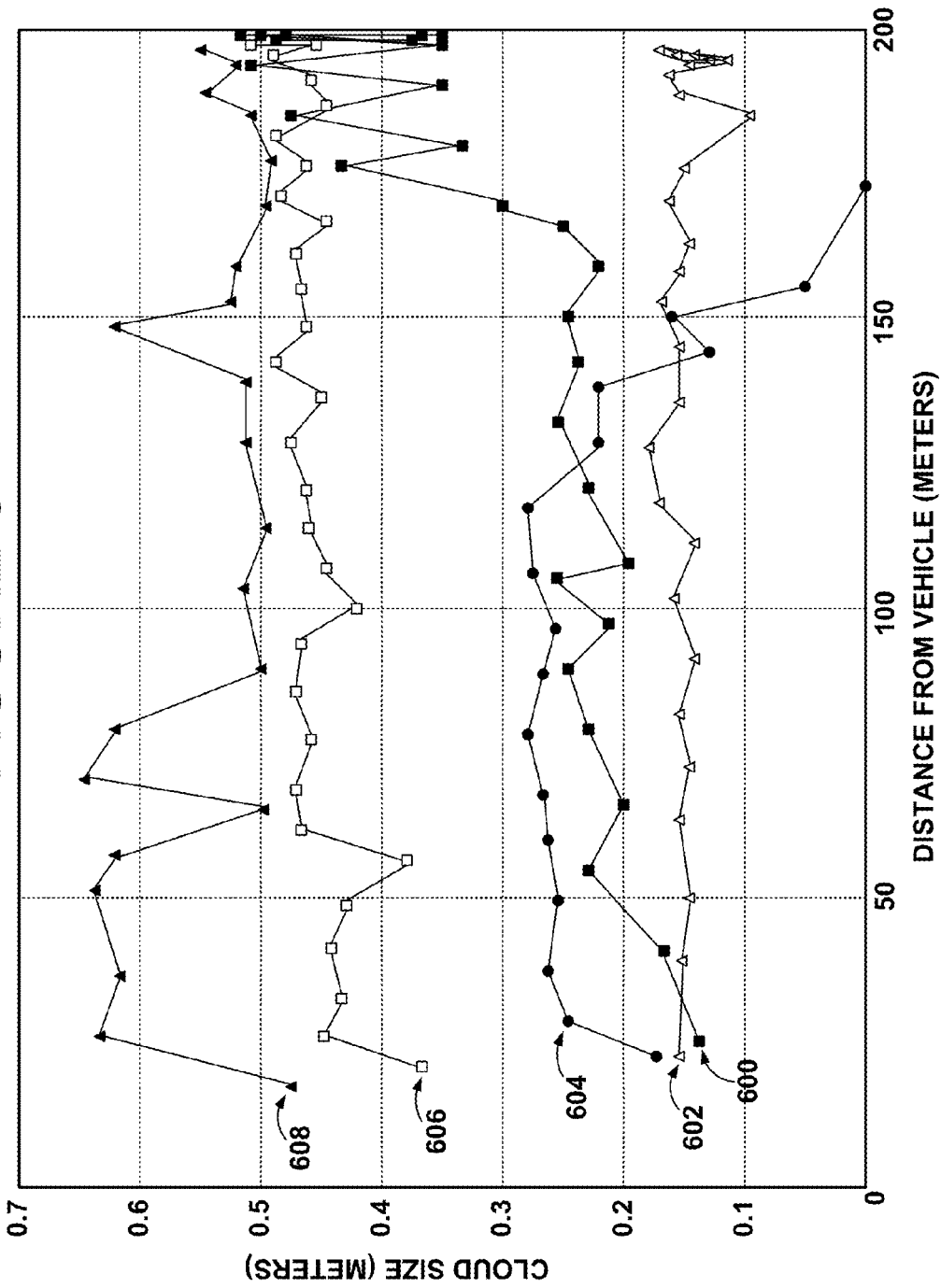

METHODS AND SYSTEMS FOR DETECTION OF REFLECTIVE MARKERS AT LONG RANGE

BACKGROUND

Unless otherwise indicated herein, the materials described in this section are not prior art to the claims in this application and are not admitted to be prior art by inclusion in this section.

Autonomous vehicles use various computing systems to aid in the transport of passengers from one location to another. Some autonomous vehicles may require an initial input or continuous input from an operator, such as a pilot, driver, or passenger. Other autonomous systems, for example autopilot systems, may be used when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are typically equipped with various types of sensors in order to detect objects in the surroundings. For example, an autonomous vehicle may include lasers, sonar, radar, cameras, and other devices which scan and record data from surroundings of the vehicle. Sensor data from one or more of these devices may be used to detect objects and their respective characteristics (position, shape, heading, speed, etc.). This detection and identification is useful for the safe operation of autonomous vehicle.

SUMMARY

Within examples, devices and methods for the detection of reflective markers at long range are provided.

In one example, a method is provided that comprises receiving laser data collected from successive scans of an environment of a vehicle. The laser data may include a plurality of laser data points that are associated with one or more objects in the environment. The method may further comprise determining a respective size of the one or more objects based on the laser data collected from respective successive scans. The method may additionally comprise determining, by a computing device and based at least in part on the respective size of the one or more objects for the respective successive scans, an object that exhibits a change in size as a function of distance from the vehicle. The method may also comprise based at least in part on determining that the object exhibits a change in size as a function of distance from the vehicle, determining that the object is representative of a reflective marker.

In another example, a non-transitory computer readable storage medium having stored therein instructions, that when executed by a computing device, cause the computing device to perform functions. The functions comprise receiving laser data collected from successive scans of an environment of a vehicle. The laser data may include a plurality of laser data points that are associated with one or more objects in the environment. The functions may further comprise determining a respective size of the one or more objects based on the laser data collected from respective successive scans. The functions may additionally comprise determining, by a computing device and based at least in part on the respective size of the one or more objects for the respective successive scans, an object that exhibits a change in size as a function of distance from the vehicle. The functions may also comprise based at least in part on determining that the object exhibits a change in size as a function of distance from the vehicle, determining that the object is representative of a reflective marker.

In still another example, a system is provided that comprises at least one processor, and data storage comprising instructions executable by the at least one processor to cause the system to perform functions. The functions comprise receiving laser data collected from successive scans of an environment of a vehicle. The laser data may include a plurality of laser data points that are associated with one or more objects in the environment. The functions may further comprise determining a respective size of the one or more objects based on the laser data collected from respective successive scans. The functions may additionally comprise determining, by a computing device and based at least in part on the respective size of the one or more objects for the respective successive scans, an object that exhibits a change in size as a function of distance from the vehicle. The functions may also comprise based at least in part on determining that the object exhibits a change in size as a function of distance from the vehicle, determining that the object is representative of a reflective marker.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 6 is a graph illustrating example information for detecting reflective markers at long range, in accordance with at least some embodiments described herein.

DETAILED DESCRIPTION

Figure 1:
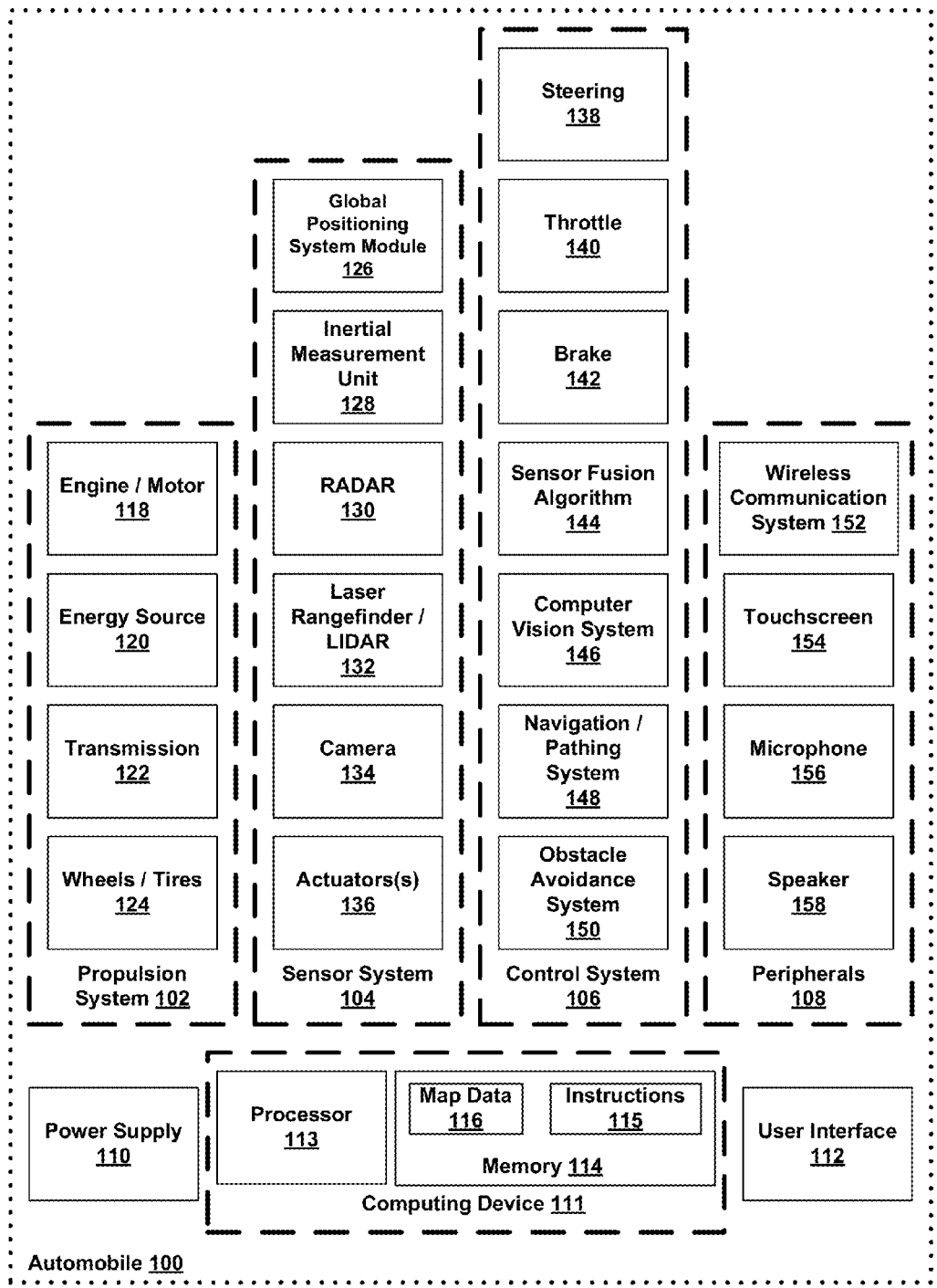
FIG. 1 is a simplified block diagram of an example vehicle, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, methods and systems are provided for detecting reflective lane markers at long ranges and modifying behavior of the vehicle accordingly. In some examples, self-driving cars or autonomous vehicles may be required to detect reflective lane markers in the path of travel of the vehicle, including at long range (e.g., 100 meters away). Further, the autonomous vehicle may be configured to determine the difference between objects that are obstacles requiring avoidance from the vehicle and lane markers that serve as guidance for a vehicle.

In one example, a method is provided that comprises receiving laser data collected from successive scans of an environment of a vehicle. A computing device may determine laser data points that are associated with any objects in the environment. In addition, the computing device may determine a respective size of any objects based on the laser data collected from respective successive scans. Based in part on the respective size of objects for the successive scans, the computing device may determine any objects that exhibit a change in size as a function of distance from the vehicle. The changes in size may be shown through variations in height, width, or other parameters. During analyzing the information provided in the successive scans, a computing device may determine that the objects that exhibit a change in size as a function of distance from the vehicle are lane markers or cat eyes. Determining a change in size may allow a computing device to detect lane markers, which may appear much larger or taller at long distances due to a blooming effect that results from laser scans bouncing off highly reflective materials at long distances. The computing device may utilize the successive scans to detect reflective markers that may be susceptible to the blooming effect at long distances upon initial detection.

In a specific example, a RADAR sensor or other type of sensor associated with an autonomous vehicle may be unable to detect a lane marker or cat eye at a long range (e.g., 100 meters away) away from the vehicle. Distances that qualify as long range may vary within different implementations. The sensors may not provide the autonomous vehicle with a proper identification of the reflective entity at long range. However, a laser sensor may collect laser data relating to the lane marker at a long range and other objects in the environment of the vehicle. Through successive scans using a LIDAR unit, a computing device may be configured to utilize the information received from the successive scans to identify reflective markers, such as cat eyes and lane markers. A computing device may be configured to determine differences, such as changes in size, shown in the successive scans received from a LIDAR unit in order to differentiate reflective markers from other objects. As an autonomous vehicle travels closer to objects detected by LIDAR at long range, highly reflective objects, such as cat eyes and lane markers, may appear to change size in the LIDAR returns. A computing device may analyze the changes to detect highly reflective objects, such as lane markers and cat eyes, from other objects that require the vehicle to plan some route of travel to avoid collisions. A computing device may provide instructions to the vehicle to ignore the reflective markers or may utilize the detection of reflective markers in other means. In some instances, the computing device may identify reflective markers utilizing the change of sizes of objects determined through the successive received laser scans as the autonomous vehicle approaches the objects and utilize the reflective markers to determine lane position or other possible means of navigational assistance.

Further information may be used to provide a higher confidence level or confirmation of detecting a lane marker at a long distance, such as previously obtained information. For example, an autonomous vehicle is likely to travel along a road with numerous lane markers or cat eyes. A computing device may utilize the information about other recently identified reflective markers to further detect other lane markers or cat eyes.

Further, an example system may take the form of a non-transitory computer-readable medium, which has program instructions stored thereon that are executable by at least one processor to provide the functionality described herein. An example system may also take the form of a vehicle or a subsystem of a vehicle that includes such a non-transitory computer-readable medium having such program instructions stored thereon.

Example systems within the scope of the present disclosure will now be described in greater detail. Generally, an example system may be implemented in or may take the form of an automobile. However, an example system may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

I. Example Vehicle

Referring now to the Figures, FIG. 1 is a simplified block diagram of an example vehicle 100, in accordance with an example embodiment. Components coupled to or included in the vehicle 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the vehicle 100. The memory 114 may include instructions 115 executable by the processor 113, and may also store map data 116. Components of the vehicle 100 may be configured to work in an interconnected fashion with each other and/or with other components coupled to respective systems. For example, the power supply 110 may provide power to all the components of the vehicle 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the vehicle 100 may include more, fewer, or different systems, and each system may include more, fewer, or different components. Additionally, the systems and components shown may be combined or divided in any number of ways.

The propulsion system 102 may be configured to provide powered motion for the vehicle 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine, etc. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the vehicle 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of vehicle 100 could be configured in various formats, including a unicycle, bicycle/motorcycle, tricycle, or car/truck four-wheel format. Other wheel/tire formats are possible as well, such as those including six or more wheels. The wheels/tires 124 of vehicle 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the vehicle 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the vehicle 100 (e.g., an $O_2$ monitor, a fuel gauge, an engine oil temperature, etc.). Other sensors are possible as well.

The GPS module 126 may be any sensor configured to estimate a geographic location of the vehicle 100. To this end, the GPS module 126 may include a transceiver configured to estimate a position of the vehicle 100 with respect to the Earth, based on satellite-based positioning data. In an example, the computing device 111 may be configured to use the GPS module 126 in combination with the map data 116 to estimate a location of a lane boundary on road on which the vehicle 100 may be travelling on. The GPS module 126 may take other forms as well.

The IMU 128 may be any combination of sensors configured to sense position and orientation changes of the vehicle 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the vehicle 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, the LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the vehicle 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the vehicle 100 illuminates an object in the environment with a predetermined light pattern, such as a grid or checkerboard pattern and uses the camera 134 to detect a reflection of the predetermined light pattern off the object. Based on distortions in the reflected light pattern, the vehicle 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the vehicle 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the vehicle 100.

The throttle 140 may be any combination of mechanisms configured to control the operating speed and acceleration of the engine/motor 118 and, in turn, the speed and acceleration of the vehicle 100.

The brake unit 142 may be any combination of mechanisms configured to decelerate the vehicle 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the vehicle 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the vehicle 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the vehicle 100. The navigation and pathing system 148 may additionally be configured to update the driving path dynamically while the vehicle 100 is in operation. In some examples, the navigation and pathing system 148 may be configured to incorporate data from the sensor fusion algorithm 144, the GPS module 126, and one or more predetermined maps so as to determine the driving path for the vehicle 100.

The obstacle avoidance system 150 may be any system configured to identify, evaluate, and avoid or otherwise negotiate obstacles in the environment in which the vehicle 100 is located.

The control system 106 may additionally or alternatively include components other than those shown.

Peripherals 108 may be configured to allow the vehicle 100 to interact with external sensors, other vehicles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other vehicles, sensors, or other entities, either directly or via a communication network. To this end, the wireless communication system 152 may include an antenna and a chipset for communicating with the other vehicles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the vehicle 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the vehicle 100. Similarly, the speakers 158 may be configured to output audio to the user of the vehicle 100.

The peripherals 108 may additionally or alternatively include components other than those shown.

The power supply 110 may be configured to provide power to some or all of the components of the vehicle 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the vehicle 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various vehicle functions, including any of the functions or methods described herein.

The components of the vehicle 100 could be configured to work in an interconnected fashion with other components within and/or outside their respective systems. To this end, the components and systems of the vehicle 100 may be communicatively linked together by a system bus, network, and/or other connection mechanism (not shown).

Further, while each of the components and systems is shown to be integrated in the vehicle 100, in some examples, one or more components or systems may be removably mounted on or otherwise connected (mechanically or electrically) to the vehicle 100 using wired or wireless connections.

The vehicle 100 may include one or more elements in addition to or instead of those shown. For example, the vehicle 100 may include one or more additional interfaces and/or power supplies. Other additional components are possible as well. In these examples, the memory 114 may further include instructions executable by the processor 113 to control and/or communicate with the additional components.

Figure 2:
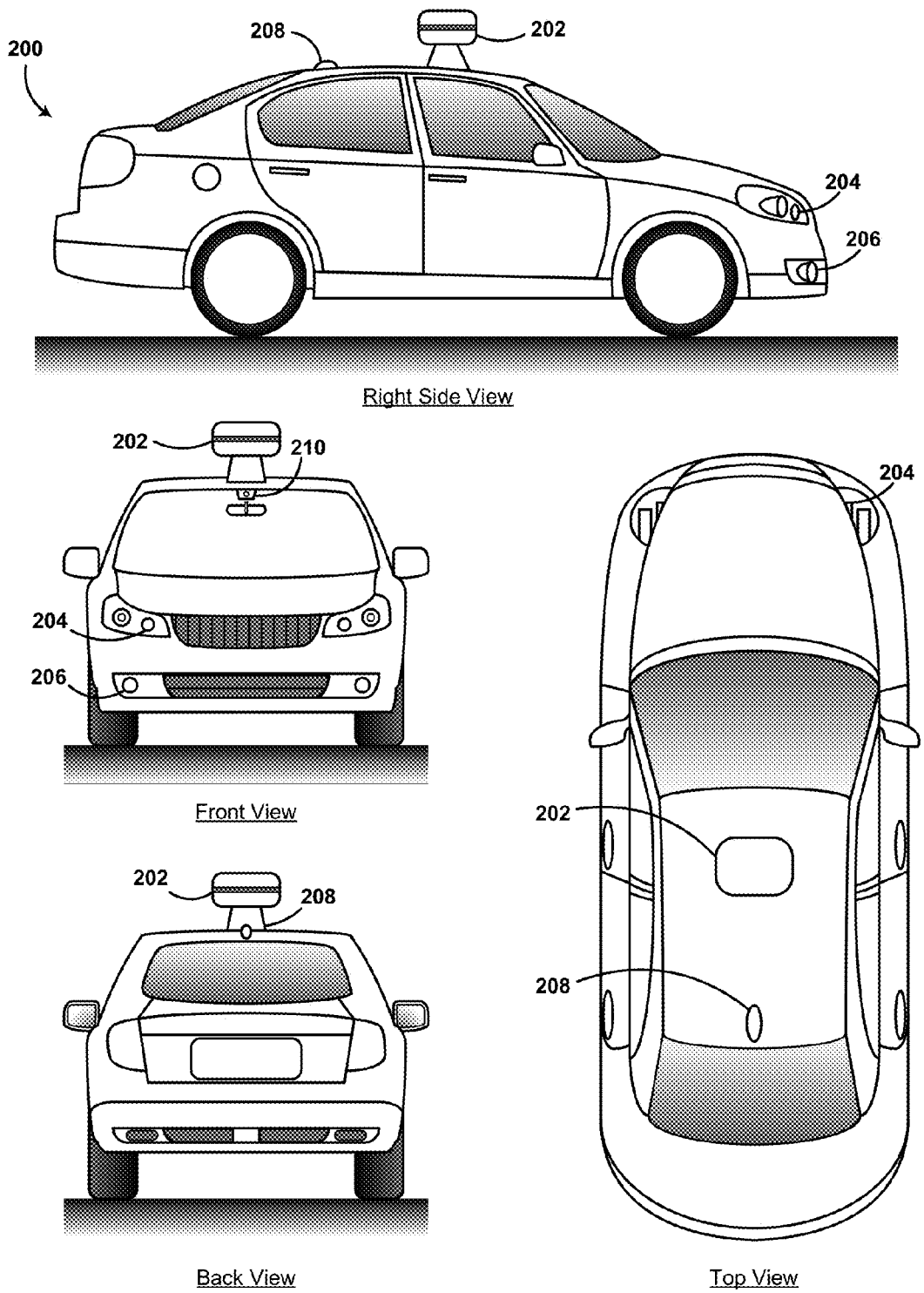
FIG. 2 depicts an example vehicle that can include all or some of the functions described in connection with the vehicle in reference to FIG. 1.

FIG. 2 illustrates an example vehicle 200, in accordance with an embodiment. In particular, FIG. 2 shows a Right Side View, Front View, Back View, and Top View of the vehicle 200. Although vehicle 200 is illustrated in FIG. 2 as a car, other examples are possible. For instance, the vehicle 200 could represent a truck, a van, a semi-trailer truck, a motorcycle, a golf cart, an off-road vehicle, or a farm vehicle, among other examples. As shown, the vehicle 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the vehicle 200, in some examples the sensor unit 202 may be mounted elsewhere on the vehicle 200, either inside or outside the vehicle 200. Further, while only three sensor units are shown, in some examples more or fewer sensor units may be included in the vehicle 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the vehicle 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other vehicles, sensors, or other entities, either directly or via a communication network as described above with respect to the wireless communication system 152 in FIG. 1. While the wireless communication system 208 is shown to be positioned on a roof of the vehicle 200, in other examples the wireless communication system 208 could be located, fully or in part, elsewhere.

The camera 210 may be any camera (e.g., a still camera, a video camera, etc.) configured to capture images of the environment in which the vehicle 200 is located. To this end, the camera 210 may take any of the forms described above with respect to the camera 134 in FIG. 1. While the camera 210 is shown to be mounted inside a front windshield of the vehicle 200, in other examples the camera 210 may be mounted elsewhere on the vehicle 200, either inside or outside the vehicle 200.

The vehicle 200 may include one or more other components in addition to or instead of those shown.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

II. Example Method

Figure 3:
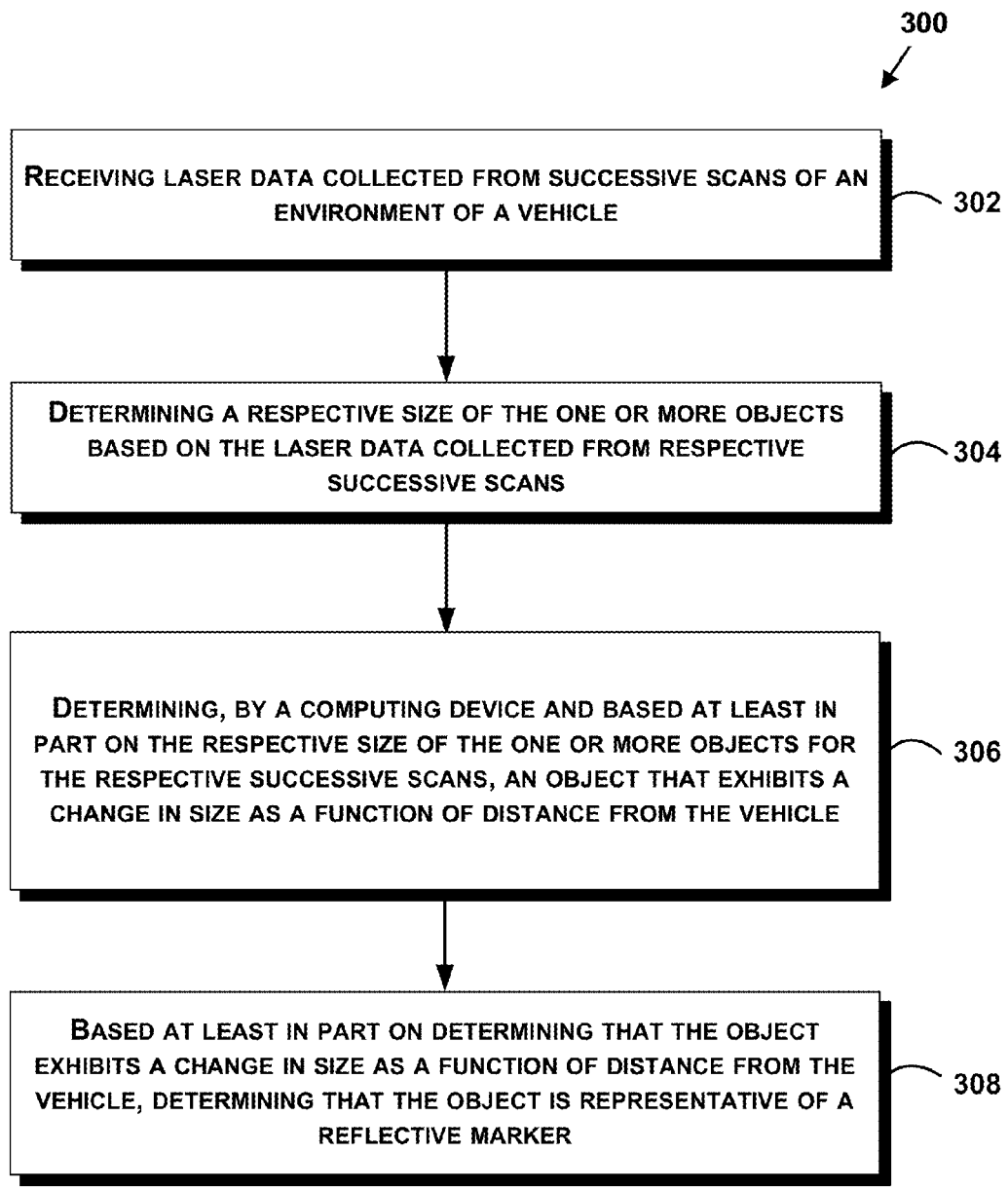
FIG. 3 is a block diagram of an example method for detecting reflective markers at long range, in accordance with at least some embodiments described herein.

FIG. 3 is a block diagram of an example method for reflective markers at long range, in accordance with at least some embodiments described herein. Method 300 shown in FIG. 3 presents an embodiment of a method that, for example, could be used with the vehicle 100 and/or vehicle 200 as illustrated and described in reference to FIGS. 1 and 2, respectively, or components of the vehicle 100 or vehicle 200. For example, the processes described herein may be carried out by the RADAR unit 130, the LIDAR unit 132, or camera 134 mounted to an autonomous vehicle (e.g., vehicle 200) in communication with the computer device 111, the sensor fusion algorithm 144, and/or the computer vision system 146. Method 300 may include one or more operations, functions, or actions as illustrated by one or more of blocks 302-308.

Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions (e.g., machine readable code) executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, a computer program product, or other article of manufacture, for example.

The non-transitory computer readable medium could also be distributed among multiple data storage elements, which could be remotely located from each other. A computing device that executes some or all of the stored instructions could be a vehicle, such as the example vehicle 200 illustrated in FIG. 2. Alternatively, the computing device that executes some or all of the stored instructions could be another computing device, such as a server.

In addition, for the method 300 and other processes and methods disclosed herein, each block in FIG. 3 may represent circuitry that is wired to perform the specific logical functions in the process.

Example methods, such as method 300 of FIG. 3 may be carried out in whole or in part by the vehicle and its sub-systems. Accordingly, example methods could be described by way of example herein as being implemented by the vehicle. However, it should be understood that an example method may be implemented in whole or in part by other computing devices of the vehicle or separate from the vehicle. For example, an example method may be implemented in whole or in part by a server system, which receives data from a device such as those associated with the vehicle. Other examples of computing devices or combinations of computing devices that can implement an example method are possible.

At block 302, the method 300 includes receiving laser data collected from successive scans of an environment of a vehicle. The laser data includes a plurality of laser data points that are based on objects in the environment that are perceived to be physically present due to reflected or backscattered light. The vehicle of components of the vehicle, such as a computing device or processor, may be configured to receive laser data that is collected. An autonomous vehicle may utilize a large number of scans or periodic scans to establish successive scans, for example. Successive scans may be multiple scans by the LIDAR unit occurring over time and may be continuous or may occur in intervals. Other examples of successive scans may exist as well.

As an example, the vehicle may have a LIDAR unit that illuminates areas around, surrounding, in front of, behind, to the side, or in any proximity or relation to the vehicle, and detects reflected light. In some cases of operation, the LIDAR may rotate and (e.g., periodically) emits laser beams. Other motions may be taken by the LIDAR as well. Reflections from the emitted laser beams by objects in the environment may then be received by suitable sensors. Time-stamping receipt of the reflected signals allows for associating each reflected signal (if any is received at all) with the most recently emitted laser pulse, and measuring the time delay between emission of the laser pulse and reception of the reflected light. The time delay provides an estimate of the distance to the reflective feature by scaling according to the speed of light in the intervening atmosphere. Combining the distance information for each reflected signal with the orientation of the LIDAR device for the respective pulse emission allows for determining a position of the reflective feature in three-dimensions. For illustrative purposes, an environmental scene can be described in the two-dimensional x-y plane in connection with a single sweep of the LIDAR device that estimates positions to a series of points located in the x-y plane. However, it is noted that a more complete three-dimensional sampling is provided by either adjusting beam steering optics to direct the laser beam up or down from the x-y plane on its next sweep of the scene or by providing additional lasers and associated beam steering optics dedicated to sampling point locations in planes above and below the x-y plane, or combinations of these.

A computing device may be configured to store the successive scans in various types of memory. The computing device may capture successive scans in intervals or may be executed simultaneously. Other examples of accumulating successive scans may exist as well.

At block 304, the method 300 includes determining a respective size of the one or more objects based on the laser data collected from respective successive scans. As an example, a tracking system may be used to track objects, and laser data points that are associated with tracked objects can be determined. Within the laser data points, a computing device may be configured to determine a respective size of the tracked objects. During respective successive scans, the computing device may capable of determine a respective size of each individual object. The computing device may determine the respective height or width related to an object. The tracking system may record the various sizes as a function of distance of the objects away from the vehicle. The tracking system may allow the computing device to determine objects which have sizes that vary as the vehicle travels closer towards the objects. Other information may be determined by the computing device through utilizing the successive scans received from the LIDAR unit.

In other examples, a point cloud corresponding to objects in the environmental can be generated. Each point in the point cloud can be referenced by an azimuth angle (e.g., orientation of the LIDAR device while emitting the pulse corresponding to the point, which is determined by the orientation of an rotating angled mirror of the LIDAR) and a line-of-sight (LOS) distance (e.g., a distance indicated by the time delay between pulse emission and reflected light reception). For pulses that do not result in a returning reflected signal, the distance in the point map can optionally be set to the maximum distance sensitivity of the LIDAR device. The maximum distance sensitivity can be determined according to the maximum time delay the associated optical sensors wait for a return reflected signal following each pulse emission, which can itself be set according to the anticipated signal strength of a reflected signal at a particular distance given ambient lighting conditions, intensity of the emitted pulse, predicted reflectivity of environmental features, etc. In some examples, the maximum distance can be approximately 60 meters, 80 meters, 100 meters, or 150 meters, but other examples are possible for particular configurations of the LIDAR device and associated optical sensors. In some examples, a LIDAR unit may be designated to primarily identify objects at long range (e.g., greater than 75 meters).

In some embodiments, the sensor fusion algorithm 138, computer vision system 140, and/or computer system 112 illustrated in FIG. 1, can be configured to interpret the collected laser data alone and/or in combination with additional sensor-indicated information and/or memory-based pattern-matching point clouds and/or baseline maps of the environment to categorize or identify group of points as corresponding to objects in the environment.

Further, each spatial point can be associated with a respective laser from a set of lasers and a respective timestamp. That is, in an embodiment where the LIDAR includes multiple lasers, each respective received spatial point can be associated with the particular laser that was detected in accordance with the respective received spatial point. Additionally, each respective spatial point can be associated with a respective timestamp (e.g., a time at which laser was emitted or received). In this way, the received spatial points may be organized, identified, or otherwise ordered on a spatial (laser identification) and/or temporal (timestamp) basis. Such an ordering may assist or improve an analysis of the spatial-point data by allowing for organizing the spatial-point data into a meaningful order. The timestamps may allow a device to record changes in sizes identified within the laser data collected.

In some examples, object detection is provided in connection with an example LIDAR device. The LIDAR device may be configured to capture laser point cloud images using one or more lasers. The laser point cloud includes many points for each pulse emitted from the LIDAR device; reflected signals may indicate actual locations of reflective objects, whereas failing to receive reflected signals indicate an absence of sufficiently reflective objects within a particular distance along the line of sight of the laser. Depending on factors including the laser pulse rate, the scene refresh rate, the total solid angle sampled by each LIDAR device (or just the total solid angle of the scene, where only one LIDAR device is used), the number of sample points in each point cloud can be determined. Some embodiments can provide point clouds with as many as 50,000 laser-indicated points, 80,000 laser-indicated points, 100,000 laser-indicated points, etc. Generally, the number of laser-indicated points in each point cloud is a tradeoff between angular resolution on the one hand, and refresh rate on the other hand. The LIDAR device is driven to provide an angular resolution at a sufficiently high refresh rate to be relevant to real time navigational decisions for an autonomous vehicle. Thus, the LIDAR device can be configured to capture one or more laser point clouds of the scanning zone at predetermined time intervals, such as 100 milliseconds (to achieve a refresh rate of 10 frames per second), 33 milliseconds (to achieve a refresh rate of 30 frames per second), 1 millisecond, 1 second, etc.

With reference to FIG. 1, data storage 114 of computer system 112 of vehicle 100 can store object-detector software, code, or other program instructions. Such object-detector software can include, or be part of, one or more of the control systems 106 described above, including the sensor fusion algorithm 138, computer vision system 140, and/or obstacle avoidance system 144. The object detector may be any configuration of software and/or hardware configured to perceive features in the environmental scene by categorizing and/or identifying objects based on the laser point clouds captured by the LIDAR 128 and/or based on one or more of the sensors in sensor system 104. As a laser point cloud is captured via LIDAR 128, data indicative of the captured point cloud is communicated to the object detector, which analyzes the data to determine whether there is an object present in the laser point cloud. Objects indicated by the point cloud may be, for example, a vehicle, a pedestrian, a road sign, a traffic light, a traffic cone, etc.

To determine whether an object is present in a laser point cloud image, the object detector software and/or module can associate arrangements of laser-indicated points with patterns matching objects, environmental features, and/or categories of objects or features. The object detector can be pre-loaded (or dynamically instructed) to associate arrangements according to one or more parameters corresponding to physical objects/features in the environment surrounding the vehicle 100. For example, the object detector can be pre-loaded with information indicating a typical size of a pedestrian, a length of a typical automobile, confidence thresholds for classifying suspected objects, etc. Using similar techniques, a computing device may determine the various sizes of objects as detected within returns provided by the LIDAR unit. The computing device may determine the size of objects, such as height and width, in real-time and may utilize previous scans to assist in determining variations in size in subsequent scans.

When the object detector identifies an object in point cloud, the object detector can define a bounding box encompassing that object. For example, the bounding box can correspond to a predicted exterior surface of the point cloud indicated object. Of course, the bounding "box" can generally take the form of a multi-sided closed shape defining the predicted outer boundaries of the object. The bounding box may be based on the various sizes of detected objects. In some cases, highly reflective materials may construe the dimensions of the bounded box at long distances, such as over 75 meters away. A reflective lane marker may appear to be much larger and cause a greater bounding box to be determined at detections at long range.

For each captured point cloud, positions of perceived objects and their corresponding boundary definitions are associated with a frame number or frame time. Thus, similarly shaped objects appearing in roughly similar locations in successive scans of the scene can be associated with one another to track objects in time. The different frame times allow for differences and commonalities to be detected through successive scans. For perceived objects appearing in multiple point cloud frames (e.g., complete scans of the scanning zone), the object can be associated, for each frame on which the object appears, with a distinct bounding shape defining the dimensional extent of the perceived object.

Perceived objects can be tracked as the vehicle 100 travels through its surrounding environment and/or as objects move with respect to the vehicle so as to pass through the scanning zone of the LIDAR device 128. Traveling closer to objects may cause objects, such as lane markers or other highly reflective materials to appear to change sizes according to the successive scans. Combining two or more successively captured point clouds can thereby allow for determining translation information for detected objects. Future position predictions can be made for objects with characterized motion profiles, such as by observing acceleration and/or velocity of objects such as cars moving along the roadway with the vehicle 100 to predict the location of the object during a subsequent scan. In some embodiments, objects moving through the air are assumed to move along a trajectory influenced by the force of gravity.

To assist in providing object recognition, the vehicle 100 can also be in communication with an object-identification server (e.g., via the wireless communication system 146). The object-identification server can verify and/or classify objects detected by vehicle 100 using the object detector. Moreover, the object-identification server can facilitate optimization of one or more of the parameters used by the object detector to detect objects in the captured laser point cloud based on accumulated data from other similar systems, local conditions. In one embodiment, vehicle 100 can communicate the object boundaries, and their corresponding object parameters, to the object identification server for verification that the perceived objects are correctly identified, such as indicated by an evaluation for statistical likelihood of correct identification.

Referring back to FIG. 3, at block 306, the method 300 includes determining, by a computing device and based at least in part on the respective size of the one or more objects for the respective successive scans, an object that exhibits a change in size as a function of distance from the vehicle. The computing device may determine that the object exhibits a change in height or width or another parameter based on the function of distance.

As a vehicle continues to move towards objects, successive scans by a LIDAR unit may provide returns that show that the sizes of detected objects are either relatively consistent at the same approximate level or may show significant changes. A computing device may be configured to differentiate between the respective sizes for each detected object, which may include heights or widths of the objects. The majority of objects may likely cause the LIDAR unit to receive returns showing consistent sizes reflecting an approximate actual size of the object. However, some objects may cause the LIDAR unit to receive returns that do not reflect the actual size of the object. In the case that the object causes LIDAR returns to reflect a changing size in successive scans, a computing device may identify that the size changes is an indication that the LIDAR is not detecting the actual size of the object.

An autonomous vehicle may utilize the various successive scans to determine objects that exhibit changes in size as a function of distance from the vehicle. As the vehicle continues to travel towards objects, a computing device may be configured to keep track of the various parameters of objects throughout the successive scans, including the respective height of objects. A computing device or another entity may determine the objects that produce different heights as the vehicle continues to get closer. In some examples, a computing device may determine objects based on distances and predefined thresholds that define how far away the vehicle is away from the objects. For example, the computing device may require that the height or width changes through the received successive scans that meet a threshold level.

In some examples, a computing device may receive initial returns from the LIDAR unit that are impacted by a blooming effect. The blooming effect may cause LIDAR returns of highly reflective objects and/or other materials to appear to be different sizes than the objects actual sizes at long distances. For example, the blooming effect may cause a computing device to perceive some objects as much taller or larger at long distances away from the LIDAR unit.

At block 308, the method 300 includes based at least in part on determining that the object exhibits a change in size as a function of distance from the vehicle, determining that the object is representative of a reflective marker. A computing device may utilize the information provided from the successive LIDAR scans to determine that an object exhibiting changes in height as the LIDAR unit gets closer to the object is indicative of a reflective marker, such as lane markers, cat eyes, or a similar reflective object. Highly reflective materials, such as lane markers and cat eyes, may likely cause the LIDAR unit to detect improper sizes, such as inaccurate heights or widths of objects, at long ranges. Due to a blooming effect that may result from the LIDAR scans detecting highly reflective objects at long ranges, cat eyes and lane markers may appear much taller or larger to a computing device that analyzes the LIDAR returns. The blooming effect may occur due the lasers reflecting off reflective materials over a long range, such as 50 meters or greater. The improper height may become apparent to a computing device of an autonomous vehicle as the vehicle becomes closer and the height varies as the distance between the reflective materials and vehicle decreases.

In some implementations, a computing device or another entity associated with a vehicle may differentiate reflective markers, such as lane markers and cat eyes, from other objects for the purpose of obstacle avoidance. An obstacle avoidance of an autonomous vehicle may utilize the recognition of lane markers to assist in navigating the vehicle. A computing device may determine that variations in detected size during successive scans is indicative that the detected objects displaying variation in size as the vehicle approaches are lane markers or cat eyes.

In some examples, additional data may be considered (in addition to laser data points being unassociated with tracked objects) to provide further indications of reflective marker, or to provide a higher probability or confidence that an object is reflective marker.

A computing device may identify reflective markers due to the different patterns displayed through successive scans. Through tracking the variation in sizes of each object, a computing device may differentiate reflective markers from other objects since the successive scans may show variation as the vehicle gets closer to the objects.

In one example, a computing device may factor the relative position of objects to detect lane markers or cat eyes. Further, the computing device may utilize information received from other sensors, such as RADAR or GPS, in addition to the information provided by the LIDAR unit to determine reflective markers.

In another example, a computing device associated with a vehicle may be configured to utilize an algorithm to determine differences within the successive scans obtained from long range that lead the computing device to identify reflective markers. The computing device may manipulate the statistical evidence received within LIDAR scans. In an example, a computing device may determine a lane position of the vehicle based on determining that an object or objects are representative of lane markers or cat eyes. Further, a computing device may determine subsequent lane markers or cat eyes based in part on a prior respective laser data corresponding to data representative of a lane marker or cat eye. The computing device may be configured to determine that lane markers or cat eyes may be positioned in similar patterns, such as placed in the center of a road every couple of meters, for example.

A computing device may be configured to manipulate one or more systems of the vehicle based on detecting lane marker or cat eyes. The computing device may provide instructions to the steering-system, throttle system, brake system, or other systems based on detecting lane marker, cat eyes, or other objects. For example, the computing device may send instructions to the obstacle avoidance and path planning functionality of the vehicle. A computing device may determine reflective markers based on the LIDAR unit providing measurements of properties of scattered light on objects, such as reflectivity levels.

A computing device may be configured to determine changes based on angles within the returns provided by the LIDAR unit. Changes in angles may allow a computing device to identify objects that vary as the vehicle travels closer to the objects. A computing device may utilize various thresholds to determine lane markers or cat eyes.

Figure 4:
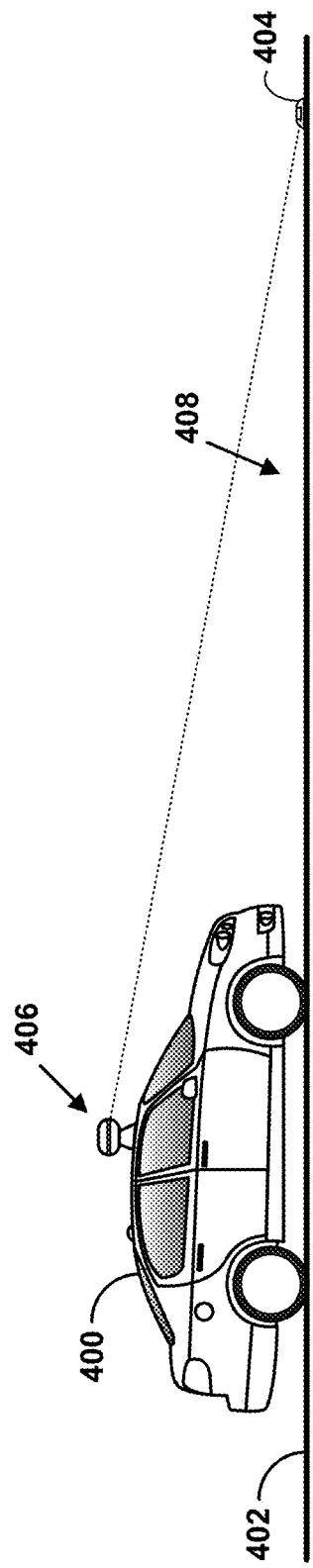
FIG. 4 is a conceptual side view illustration of example detection of a reflective marker at long range, in accordance with at least some embodiments described herein.

FIG. 4 is a conceptual side view illustration of example detection of a reflective marker at long range, in accordance with at least some embodiments described herein. In FIG. 4, an autonomous vehicle 400 is traveling on surface 402 with a lane marker 404 on the surface in front of the vehicle 400. The autonomous vehicle 400 may include a LIDAR unit 406 that is configured to receive laser data collected for an area in front of the vehicle 400 (e.g., as shown by the arrows in FIG. 4). The autonomous vehicle 400 may travel on surface 402 and utilize the LIDAR unit 406 to detect lane markers and other objects, such as lane marker 404. The lane marker may be detected by the LIDAR unit 406 when laser beams are reflected by the lane marker. However, the lane marker 404 may not be an object tracked by a tracking system of the vehicle 400, since other sensors (e.g., RADAR) may not detect the lane marker 404 or the LIDAR unit 406 may not track the lane marker constantly over time. Further, other sensors including the LIDAR unit 406 may initially detect the lane marker 404 as a large object that should be avoided by the autonomous vehicle 400.

The autonomous vehicle 400 may be replaced by other types of vehicle, including vehicle 100 shown in FIG. 1 and vehicle 200 shown in FIG. 2. The autonomous vehicle may be capable of being driven by a driver or by a computing device. The autonomous vehicle 400 may be traveling towards the lane marker 404 at any speed.

The surface 402 shown in FIG. 4 represents any type of surface or medium that a vehicle may travel upon. In the example, the surface 402 may represent a road of some type. In other examples, the surface 402 may represent other mediums of travel, including water or air. For example, a boat may be traveling in a water and need to identify reflective markers at a long range away from the boat.

The lane marker 404 shown within the example may be a reflective lane marker, a cat eye, or another reflective entity. The material of lane marker 404 may vary in other examples. In the example, successive scans by the LIDAR unit 406 of vehicle 400 may show that the lane marker 404 reflects various sizes at a far distance that change as the vehicle travels closer to the lane marker. The lane marker 404 may likely appear larger at a long distance (e.g., 50 meters away) to computing device analyzing the LIDAR returns. Other objects do not have the reflective properties of a lane marker or cat eye and likely return substantially similar sizes in the successive scans performed by a LIDAR unit regardless of the distance away from the vehicle. A computing device may utilize the differences shown in the successive scans by a LIDAR unit in order to differentiate the lane markers from other less-reflective objects that require avoidance by the vehicle. As the vehicle 400 travels closer to the lane marker 404, the LIDAR unit 406 may return scans that show the lane marker 404 appears to decrease in size.

The autonomous vehicle 400 shown in the example illustrated by FIG. 4 also includes a LIDAR unit 406 attached to the front of the vehicle. In other implementations, the LIDAR unit may be coupled to other portions of the vehicle. Further, a vehicle may include additional LIDAR units. The LIDAR unit 406 may be configured to focus on large range distances or may be capable of scanning for objects in any range. For example, a vehicle may be configured to include a long range LIDAR unit and a short range LIDAR unit that are each calibrated to focus upon certain ranges in front of the vehicle. The various ranges LIDAR units may be capable of being programmed by a computing device in real-time.

In the example shown by FIG. 4, the LIDAR unit 406 is actively scanning in front of the vehicle 400 for any objects, including detected lane marker 404 at a distance 408 away. The distance 408 may represent a long range, such as 50 meters, 75 meters, or more, for example. As the vehicle 400 travels towards the lane marker 404 and distance 408 decreases, the LIDAR unit 406 may detect the lane marker 404 in successive scans. In the successive scans, the lane marker 404 may initially appear to be a couple meters tall or some other size, but the lane marker may appear shorter as the vehicle travels closer. A computing device may utilize the information obtained from the successive scans by the LIDAR unit to determine that the changing in respective size received during the successive scans is evident that the detected object is a lane marker.

In some implementations, a computing device may be configured to detect the lane marker 404 based on initial scans of the LIDAR unit 406. The computing device may utilize prior information or additional information from other sensors to assist in determining lane markers and cat eyes.

Figure 5:
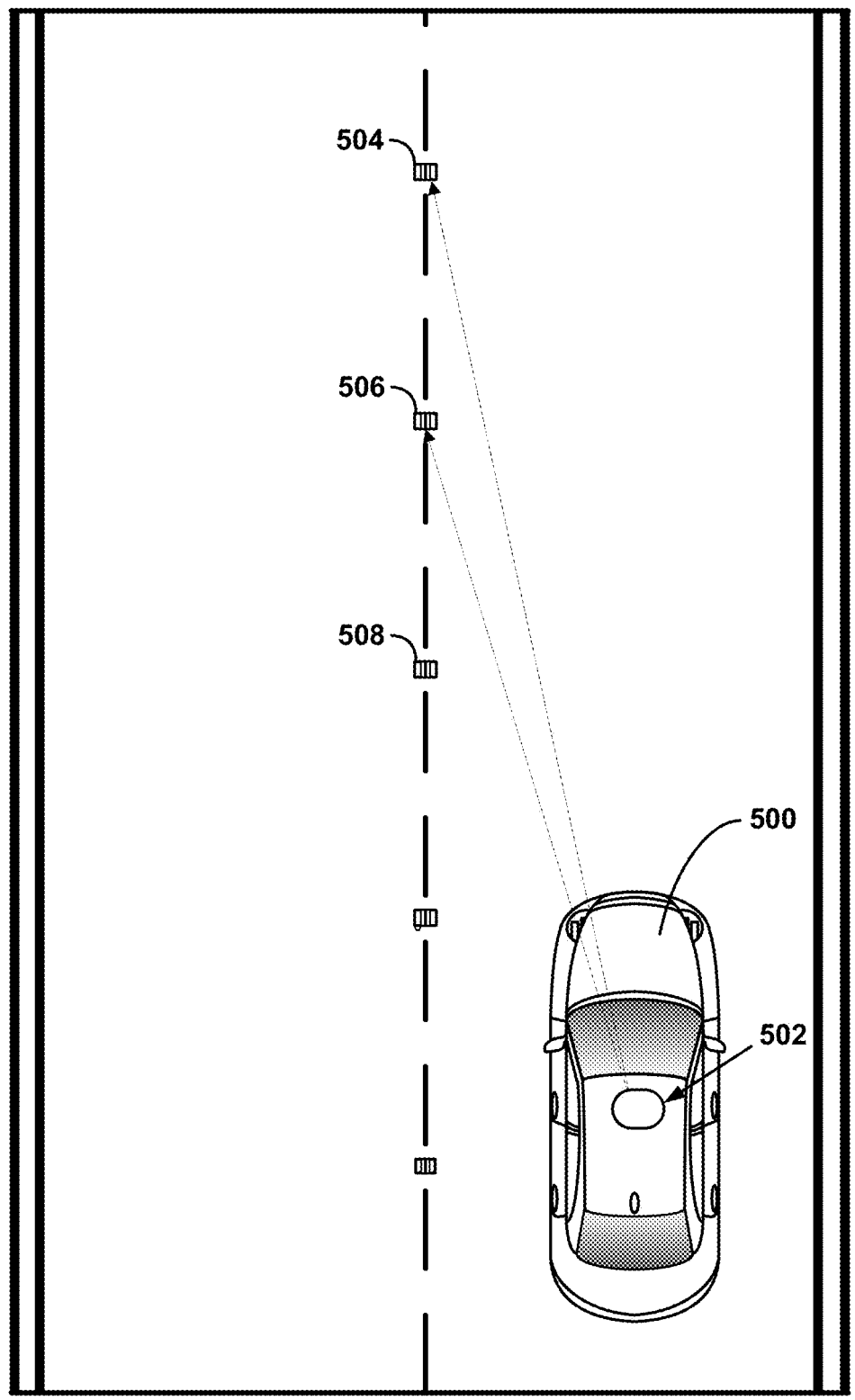
FIG. 5 is another conceptual illustration of example detection of reflective markers at long range, in accordance with at least some embodiments described herein.

FIG. 5 is a conceptual illustration of example detection of reflective markers at long range, in accordance with example embodiments described herein. FIG. 5 illustrates an aerial view of a vehicle that is detecting lane markers at long distances away from the vehicle. Within the example conceptual illustration, FIG. 5 includes a vehicle 500 with a LIDAR unit 502 for detecting lane markers, such as lane markers 504-508.

Similar to FIG. 4, the vehicle 500 may be replaced by any type of vehicle, including vehicle 100 illustrated in FIG. 1 and vehicle 200 illustrated in FIG. 2. The vehicle 500 may operate autonomously or may be controlled by a driver.

The vehicle 500 may include a LIDAR unit 502 that operates to receive laser data from an area in front of the vehicle 500 (e.g., as shown by the arrows in FIG. 5). The LIDAR unit 502 may be placed at different points of the vehicle 500. In the example, the LIDAR unit 502 is positioned on the top of the vehicle 500. Furthermore, the vehicle 500 may include additional LIDAR units.

The LIDAR unit 502 may be configured to receive laser data from the environment of the vehicle 500. The LIDAR unit 502 may be configured to focus on a specific position or range in the environment. For example, the LIDAR unit 502 may be configured to focus on long range in front of the vehicle while other sensors or LIDAR units are utilized to focus on short range objects. Furthermore, the LIDAR unit 502 may be capable of scanning for various objects in the environment of the vehicle in real-time.

The lane markers 504-508 shown in the example represent lane markers or cat eyes. In other examples, the lane markers 504-508 may represent similar reflective materials that indicate position on a road. The lane markers 504-508 may be created using materials that cause LIDAR returns to show a misconstrued size at long ranges. In some examples, the lane markers may be properly determined by a computing device using LIDAR scans at long range.

In the example, the vehicle 500 may be traveling along the road and utilizing sensors, such as LIDAR unit 502 to identify objects that may impact the path which vehicle 500 is traveling along. A computing device associated with the vehicle 500 may determine that the objects in the center of the road are lane markers 504-508. The computing device may receive LIDAR scans to determine that the entities are lane markers. In some instances, the computing device may use additional information to determine that the entities are lane markers 504-508.

In the example, FIG. 5 shows dotted arrows pointing towards lane marker 504 and lane marker 506. The dotted arrows may represent the path that lasers travel from the sensors of the vehicle 500. In addition, in the example, the LIDAR unit 502 does not include a dotted line to lane marker 508. In one implementation, a computing device may have determined that lane marker 508 is a reflective marker first since the lane marker 508 is closer than lane markers 504-506 to the vehicle 500. A computing device associated with the vehicle may provide instructions to the vehicle 500 that does not require the vehicle to alter its path of travel. The computing device may still receive scans from the LIDAR unit that contain lane marker 508 and other objects. The computing device may receive information about the lane markers as the vehicle continues to travel along the road. The information obtained from the LIDAR unit may allow a computing device associated with vehicle 500 to determine that reflective objects, such as lane markers, may appear at false sizes at long range, including inaccurate heights or wdiths. Through successive scans by the LIDAR unit, a computing device may analyze the objects with changing heights as a function of distance of the vehicle from the objects. Based on the changing heights, a computing device may identify the lane markers.

In one example implementations, the LIDAR unit may receive successive scans that show the lane markers are changing heights. A computing device may first determine that closer lane markers were producing false heights at long ranges due to the blooming effect as the vehicle traveled closer to the computing device. A computing device may utilize additional information from other sensors. Furthermore, the computing device may use prior determinations, such as recently identified lane markers, to further detect subsequent lane markers. A computing device may be configured to determine patterns that lane markers or cat eyes may be positioned in on a road way or other surface.

In an example, the computing device associated with vehicle 500 may receive successive scans from the LIDAR unit 502 that allows the computing device to differentiate reflective markers, such as lane markers 504-508 or cat eyes, from other detected objects. The computing device may detect the lane markers at long range using the LIDAR unit and may initially receive returns that cause the computing device to perceive that lane marker 504 is larger or much taller than lane marker 504 actually is. In some instances, the computing device may have detected that lane marker 506 and lane marker 508 are lane markers since the vehicle is closer to them. However, the computing device may not have determined that lane marker 504 is actually a lane marker 504 since the lane marker is at a long range away. As the vehicle travels closer to the lane marker 504, a computing device may identify that lane marker 504 is a lane marker based on changes in height or size shown in successive LIDAR scans.

FIG. 6 is a graph illustrating example information for detecting reflective markers at long range, in accordance with at least some embodiments described herein. Within FIG. 6 is an example graph illustrating cloud height of the laser returns from objects received by a LIDAR unit of a vehicle versus the distance of the objects away from the vehicle. The example graph serves as an example means that a computing device may develop through successive LIDAR scans and utilize to determine if any objects display features at far distances from the vehicle that are indicative of a reflective marker. Other graphs or statistics may be gathered by a computing device from the successive scans as well.

In the example graph shown in FIG. 6, the vertical axis (y-axis) displays determined cloud height of the laser returns from the successive scans. The horizontal axis (x-axis) displays the distance of the objects away from the vehicles. For both axes, the cloud height of the laser returns and the distance of the objects away from the vehicle are measured in meters. In other examples, other measurement units may be used, such as yards, feet, etc. Furthermore, other example graphs may illustrate similar information in different formats utilizing different axis labels. The example graph serves as one possible representation, but may be demonstrated using different formats or means. Furthermore, a computing device detecting reflective markers at long ranges does not necessarily require the use of a graph or graphs. The computing device may use other means, such as statistical analysis or other means.

A computing device may utilize information in addition to the successive scans to determine reflective markers at long ranges. For example, a computing device may utilize information received from various sensors in addition to the LIDAR unit returns.

Within the example graph illustrated by FIG. 6, five different laser measurements are shown representing the laser returns a LIDAR unit may receive from five different objects. The example returns are represented by the lines 600-608. The example graph shows the different cloud size, which may include height or width of the laser returns that a LIDAR unit receives as a vehicle approaches an object closer. In some graphs, the cloud size may be replaced by cloud height or cloud width. In other example graphs, the cloud size may represent a combination of cloud height or width of objects. For the majority of the objects, a general trend is followed that shows that the object does not shrink in size in LIDAR scans as the vehicle travels closer to the object. Lines 602-608 demonstrate normal objects that remain substantially constant in size throughout the LIDAR scans as the vehicle approaches the objects. However, line 600 differs from the other lines shown on the example graph shown in FIG. 6. The line 600 represents a reflective marker, such as a lane marker or cat eye, which decreases in cloud height received during the successive scans as the distance from the vehicle of the object decreases. The line 600 represents that a computing device may determine that a lane marker or cat eye may appear as much taller in long range LIDAR returns, but may decrease as the vehicle travels towards the object. Similar patterns may exist for objects with similar reflective properties to lane markers or cat eyes. In other objects, a cat eye or lane marker may display different levels of changes in size as the vehicle becomes closer to the object. Furthermore, a computing device may be configured to identify objects as a lane marker or cat eye in the case that the returns of the object show a change in height or size above a threshold level. The threshold level may be predefined or may be changeable to match the conditions within the environment.

Lines 602-608 may represent various objects that require the vehicle to plan some path of travel to avoid a collision with. The objects may include ladders, chairs, tires, other vehicles, trees, bridges, railroad equipment, shrubs, or other entities that may cause damage to a vehicle in a collision. A LIDAR unit approaching these units may return the same cloud height of the actual height of the object for the majority of the successive scans as the vehicle approaches the object. Further, the non-reflective objects may likely not display a change in detected height or size within the successive LIDAR scans as the vehicle travels closer. This differs from highly reflective materials, such as lane markers or cat eyes, that may appear to be much taller or larger in LIDAR scans at long distances away (e.g., 100 meters) from the vehicle due to the blooming effect previously discussed. However, a computing device may utilize the information provided by successive scans by the LIDAR unit as the vehicle travels closer in order to differentiate the highly reflective materials that display changes in height compared to other objects that display a relatively constant height within the scans regardless of the distance between the objects and the vehicle. In some instances, an autonomous vehicle may utilize LIDAR scans in intervals or other periodic means to assist in detecting various objects.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:

1. A method comprising:
receiving laser data collected from successive scans of an environment of a vehicle, wherein the laser data includes a plurality of laser data points that are associated with one or more objects in the environment;
determining a respective size of the one or more objects based on the laser data collected from respective successive scans;
determining, by a computing device based at least in part on the respective size of the one or more objects for the respective successive scans, an object that exhibits a decrease in size in the respective successive scans above a threshold as the vehicle travels closer to the object; and
based at least in part on determining that the object exhibits the decrease in size in the respective successive scans above the threshold as the vehicle travels closer to the object, determining that the object is representative of a reflective marker.

2. The method of claim 1, further comprising:
determining an intensity of the plurality of laser data points; and
wherein determining the respective size of the one or more objects based on the laser data collected from respective successive scans comprises:
determining the respective size of the one or more objects for the plurality of laser data points having an intensity above a threshold level.

3. The method of claim 1, further comprising determining to disregard respective laser data corresponding to the object representative of the reflective marker for obstacle avoidance functionality.

4. The method of claim 1, wherein the vehicle is configured to operate in an autonomous mode.

5. The method of claim 1, further comprising determining, based on determining that the object is representative of a reflective marker, a lane position of the vehicle.

6. The method of claim 1, further comprising determining subsequent reflective markers based at least in part on prior received respective laser data corresponding to the object representative of the reflective marker.

7. A system, comprising:
at least one processor; and
a memory having stored thereon instructions that, upon execution by the at least one processor, cause the system to perform functions comprising:
receiving laser data collected from successive scans of an environment of a vehicle, wherein the laser data includes a plurality of laser data points that are associated with one or more objects in the environment;
determining a respective size of the one or more objects based on the laser data collected from respective successive scans;
determining, based at least in part on the respective size of the one or more objects for the respective successive scans, an object that exhibits a decrease in size in the respective successive scans above a threshold as the vehicle travels closer to the object; and
based at least in part on determining that the object exhibits the decrease in size in the respective successive scans above the threshold as the vehicle travels closer to the object, determining that the object is representative of a reflective marker.

8. The system of claim 7, wherein the functions further comprise:
determining an intensity of the plurality of laser data points; and
wherein determining the respective size of the one or more objects based on the laser data collected from respective successive scans comprises:
determining the respective size of the one or more objects for the plurality of laser data points having an intensity above a threshold level.

9. The system of claim 7, wherein the functions further comprise:
determining to disregard respective laser data corresponding to the object representative of the reflective marker for obstacle avoidance functionality.

10. The system of claim 7, wherein the vehicle is configured to operate in an autonomous mode.

11. The system of claim 7, wherein the functions further comprise determining, based on determining that the object is representative of a reflective marker, a lane position of the vehicle.

12. The system of claim 7, wherein the functions further comprise determining subsequent reflective markers based at least in part on prior received respective laser data corresponding to the object representative of the reflective marker.

13. A non-transitory computer readable medium having stored thereon instructions that, upon execution by a computing device, cause the computing device to perform functions comprising:

receiving laser data collected from successive scans of an environment of a vehicle, wherein the laser data includes a plurality of laser data points that are associated with one or more objects in the environment;

determining a respective size of the one or more objects based on the laser data collected from respective successive scans;

determining, based at least in part on the respective size of the one or more objects for the respective successive scans, an object that exhibits a decrease in size in the respective successive scans above a threshold as the vehicle travels closer to the object; and based at least in part on determining that the object exhibits the decrease in size in the respective successive scans above the threshold as the vehicle travels closer to the object, determining that the object is representative of a reflective marker.

14. The non-transitory computer readable medium of claim 13, wherein the functions further comprise:

determining an intensity of the plurality of laser data points; and wherein determining the respective size of the one or more objects based on the laser data collected from respective successive scans comprises:

determining the respective size of the one or more objects for the plurality of laser data points having an intensity above a threshold level.

15. The non-transitory computer readable medium of claim 13, wherein determining that the object is representative of a reflective marker includes determining that the object is representative of a reflective marker.

16. The non-transitory computer readable medium of claim 13, wherein the functions further comprise determining, based on determining that the object is representative of a reflective marker, a lane position of the vehicle.

17. The non-transitory computer readable medium of claim 13, wherein the functions further comprise determining subsequent reflective markers based at least in part on prior received respective laser data corresponding to the object representative of the reflective marker.

\* \* \* \* \*